United States Patent Office 3,492,360
Patented Jan. 27, 1970

---

3,492,360
2-METHYL-6-(4′-METHYL-3′-CYCLOHEXEN-1′-YL)-5-HEPTEN-2-OL
Walter Kimel, Highland Park, and Ronald Propper, Fair Lawn, N.J., assignors, by mesne assignments, to Givaudon Corporation, Clifton, N.J., a corporation of New Jersey
No Drawing. Filed Apr. 14, 1967, Ser. No. 630,800
Int. Cl. C07c 35/18
U.S. Cl. 260—617                                    1 Claim

---

ABSTRACT OF THE DISCLOSURE 2-methyl-6-(4′-methyl-3′-cyclohexen-1′-yl)-5-hepten-2-ol, which is useful in the perfumery art and a process for its preparation from 3-(4′-methyl-3′-cyclohexen-1′-yl)-1-buten-3-ol.

---

SUMMARY OF INVENTION

This invention relates to the novel compound 2-methyl-6-(4′-methyl-3′-cyclohexen-1′-yl)-5-hepten-2-ol having the structure:

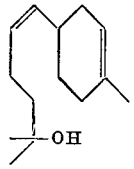

(I)

The compound of the Formula I has a unique soft, mellow slightly sweet, fruity peach-like sesquiterpene odor. This compound of Formula I, because of its fine fragrance, is extremely useful as an odorant in the preparation of perfumes and in the preparation of other scented compositions. The compound of Formula I possesses a unique fragrance so that a peach-like odor can be imparted to compositions or perfume preparations. Furthermore, the compound of Formula I above does not possess any traces of a woody or wood-like odor. Hence, by means of this invention, one can obtain for the first time, a synthetic compound which will impart a fruity peach-like odor to various perfume preparations and other like compositions.

The compound of Formula I above is prepared from a compound of the formula:

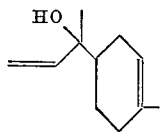

(II)

by first treating the compound of the Formula II with diketene to produce a compound of the formula:

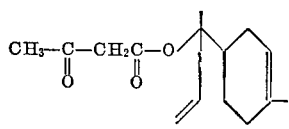

(III)

The compound of Formula III is then heated in the presence of aluminum tri(lower alkoxide) to form a compound of the formula:

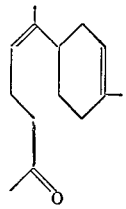

(IV)

The compound of the Formula IV above is converted to the compound of the Formula I above by treating the compound of the Formula IV with an organo metallic methyl compound.

DETAILED DESCRIPTION OF INVENTION

The compound of Formula II above is converted to the compound of Formula III above by treating the compound of Formula II above with diketene. Generally, this reaction is carried out in the presence of an inert organic solvent, preferably a hydrocarbon solvent such as pentane. However, any conventional inert organic solvent can be utilized in carrying out this reaction. Typical inert organic solvents which can be utilized include petroleum ether, benzene, dioxane, ethyl ether, etc. In carrying out the reaction of a compound of the Formula II above with diketene to produce a compound of the Formula III above, temperature and pressure are not critical. However, temperatures of from 0° C. to 40° C., preferably room temperature, are generally employed in carying out this reaction.

The compound of the Formula III above is converted to the compound of the Formula IV above by heating the compound of the Formula III above in the presence of aluminum tri(lower alkoxide). This reaction is effected by adding catalytic amounts of an aluminum tri(lower alkoxide) to the compound of Formula III above and heating the mixture, preferably with sufficient stirring at a temperature sufficiently high to cause a steady evolution of carbon dioxide. The completion of the reaction is indicated by the cessation of the evolution of carbon dioxide. In carrying out this reaction, temperatures of from 170° C. to 200° C. are utilized with 180 to 190° C. being the preferred range. This reaction can be carried out in the presence of an inert organic solvent, preferably a solvent which has a boiling point of over 200° C. Solvents which may be used include high boiling hydrocarbons or hydrocarbon fractions, e.g., "Decalin", "Tetralin", mineral oil, petroleum ether, high boiling inert ethers, e.g., diphenyl ether, etc. Aluminum tri(lower alkoxides) which are used as catalysts in this reaction include for example, aluminum tri(methoxide), aluminum tri(ethoxide), aluminum tri(isopropoxide), aluminum tri(n-butoxide), aluminum tri(n-pentoxide), aluminum tri(n-heptoxide), etc. It is preferred, however, to use an aluminum tri(lower alkoxide) when the alkoxide radical contains from 2 to 4 carbon atoms, e.g., aluminum tri(ethoxide), aluminum tri(isopropoxide), aluminum tri(n-butoxide), aluminum tri(t-butoxide), and the like. Particularly preferred aluminum tri(lower alkoxide) is aluminum tri(isopropoxide).

The compound of Formula IV above is converted to the compound of Formula I above by treating the compound of Formula IV above with an organo metallic methyl compound. The reaction whereby the compound of the Formula IV above is converted into the compound of Formula I above is carried out by simply adding an organo metallic compound of a methyl radical to the compound of Formula IV above. This reaction should be carried out in an inert organic solvent at a temperature of from about −60° C. to about 35° C. While temperatures above room temperature or 35° C. or temperatures below −60° C. can be utilized, it is seldom advisable to utilize these extreme temperatures due to the fact that the use of these temperatures is not economical and no additional beneficial results are achieved thereby. Any conventional inert organic solvent can be utilized as the reaction medium in accordance with this invention. Included among the solvents suitable for the purpose of the present invention are the solvents hereinbefore designated.

In accordance with this invention, the organo metallic compound which is utilized to methylate compounds of Formula IV above can be any organo metallic compound of a methyl radical. Any conventional metallic methyl compound can be utilized in accordance with this invention. Typical metallic methyl compounds include the Grignard salts. Among the many organo metallic methyl compounds which can be utilized to prepare the compound of Formula I above are included methyl magnesium iodide, methyl lithium, etc. The organo metallic compound can be added to the compound of Formula IV above in an amount sufficient to convert all of the compound of Formula IV above into the compound of Formula I. Therefore, in carrying out this reaction, it is preferable to add about 1 mole of the organo metallic compound per mole of the compound of Formula IV above. If desired, a molar excess of organo metallic compound can be utilized in the reaction, i.e., from about 1 to 4 moles of the organo metallic compound per mole of the compound of Formula IV above.

The following examples are illustrative but not limitative of the present invention.

EXAMPLE 1

This example is directed to the preparation of 3-(4'-methyl-3'-cyclohexen-1'-yl)-1-buten-3-yl acetoacetate.

To 1,113 g. (6.7 moles) of 3-(4'-methyl-3'-cyclohexen-1'-yl)-1-buten-3-ol in 1,115 cc. pentane were added 13.4 cc. pyridine and 13.4 cc. acetic acid. To this mixture, 618 g. (7.37 moles) of diketene was added during 6 hours at 20–30° C. After stirring an additional two hours at room temperature, the reaction mixture was stored in a refrigerator at 0–10° C. overnight. It was then transferred to a separatory funnel and washed two times with cold water, two times with saturated sodium bicarbonate solution and one time with saturated sodium chloride solution. The pentane solution was dried over anhydrous sodium sulfate, filtered and concentrated in vacuo at a maximum temperature of 50° C. at one millimeter, giving 3 - (4' - methyl - 3' - cyclohexen - 1' - yl) - 1 - buten - 3 - yl acetoacetate.

EXAMPLE 2

This example is directed to the preparation of 6-(4'-methyl-3'-cyclohexen-1'-yl)-5-hepten-2-one.

1,677 g. (6.7 moles) of 3-(4'-methyl-3'-cyclohexen-1'-yl)-1-buten-3-yl acetoacetate was placed in a dropping funnel attached to a three-liter flask equipped with a thermometer, stirrer, reflux condenser and an outlet at the top of the condenser, leading to a Dry Ice trap and a gas meter. To the flask were added 25.2 g. of aluminum isopropoxide and one quarter of the contents of the dropping funnel. Heat was applied and evolution of carbon dioxide was measured when the temperature reached 130° C. The temperature was raised to 175–190° C. at which point carbon dioxide evolution was vigorous. After 20 minutes, gas evolution began to subside. The remaining contents of the dropping funnel were then added at such a rate as to maintain a steady vigorous rate of carbon dioxide evolution at 175–190° C. This required three and one half hours. Heating at the same temperature was continued until gas evolution ceased. 142.5 liters of carbon dioxide was evolved, which is equal to 87 percent of theory. After cooling, the reaction mixture was distilled through a Vigreaux column. The fraction boiling at 93 to 97° C. at 0.3 mm. was collected. This material was identified as 6-(4'-methyl-3'-cyclohexen-1'-yl)-5-hepten-2-one.

EXAMPLE 3

This example is directed to the preparation of 2-methyl-6-(4'-methyl-3'-cyclohexen-1'-yl)-5-hepten-2-ol.

A solution of methyl magnesium iodide was prepared in ethyl ether by addition of 374.7 g. (2.64 moles) of methyl iodide in 1,350 cc. ethyl ether to 58.4 g. (2.4 moles) of magnesium in 525 cc. ethyl ether during seven hours at 20–25° C. under nitrogen. After stirring overnight at room temperature, the solution was cooled to 0° C., and 495.2 g. (2.4 moles) of 6-(4'-methyl-3'-cyclohexen-1'-yl)-5-hepten-2-one in 500 cc. of ethyl ether was added during eight hours at 0° C. The reaction mixture was then allowed to warm to room temperature while stirring overnight. It was then quenched by pouring into 129.3 g. (2.64 equivalents) of sulfuric acid in 3.5 kgs. of ice. The ether layer was separated and the aqueous layer was extracted twice with ethyl ether. All ether layers were combined and washed twice with 2 percent sodium thiosulfate solution, once with cold water, once with saturated sodium bicarbonate solution and finally once with saturated sodium chloride solution. The ether solution was dried over sodium sulfate, filtered and concentrated at 50° C. and 20 mm. The residue of 528.0 g. was distilled through a Vigreaux column. The fraction boiling at from 103.5–105.5° C. at 0.15 mm. was collected. This fraction was identified as pure 2-methyl-6-(4'-methyl-3'-cyclohexen-1'-yl)-5-hepten-2-ol.

We claim:
1. A compound of the formula:

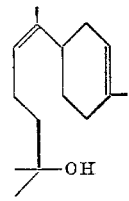

References Cited

UNITED STATES PATENTS 2,812,353   11/1957   Kimel _____ 260—483
2,839,579   6/1958    Kimel et al. _____ 260—483

OTHER REFERENCES

Nazarov et al.: "Chem. Abstracts," vol. 54 (1960), col. 8669.

Lacey: "J. Chem Soc." (March 1954), pp. 827 to 832.

LEON ZITVER, Primary Examiner

J. E. EVANS, Assistant Examiner

U.S. Cl. X.R.
252—522; 260—483, 586